United States Patent
Xu et al.

(10) Patent No.: US 11,811,235 B2
(45) Date of Patent: Nov. 7, 2023

(54) INVERTER APPARATUS AND POWER SUPPLY SYSTEM

(71) Applicant: Huawei Digital Power Technologies Co., Ltd., Shenzhen (CN)

(72) Inventors: Minghui Xu, Shanghai (CN); Tiansan Lin, Shanghai (CN); Yongbing Gao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/447,485

(22) Filed: Sep. 13, 2021

(65) Prior Publication Data

US 2021/0408800 A1 Dec. 30, 2021

Related U.S. Application Data

(63) Continuation of application No. PCT/CN2020/098207, filed on Jun. 24, 2020.

(30) Foreign Application Priority Data

Jul. 31, 2019 (CN) .......................... 201910703078.2

(51) Int. Cl.
*H02J 3/38* (2006.01)
*H02J 3/46* (2006.01)
(Continued)

(52) U.S. Cl.
CPC ............... *H02J 3/381* (2013.01); *H02J 3/46* (2013.01); *H02M 1/32* (2013.01); *H02M 7/493* (2013.01)

(58) Field of Classification Search
CPC .. H02J 3/381; H02J 3/46; H02M 1/32; H02M 7/493
USPC .......................................................... 307/56
See application file for complete search history.

(56) References Cited

U.S. PATENT DOCUMENTS 8,492,926 B2   7/2013  Collins et al.
8,582,331 B2 * 11/2013 Frisch ................ H03K 17/6871
                                                363/56.02
(Continued)

FOREIGN PATENT DOCUMENTS

CN        202268736 U     6/2012
CN        103269166 A     8/2013
(Continued)

*Primary Examiner* — Rexford N Barnie
*Assistant Examiner* — Swarna N Chowdhuri
(74) *Attorney, Agent, or Firm* — WOMBLE BOND DICKINSON (US) LLP

(57) ABSTRACT

An inverter apparatus is disclosed in this application, which includes a plurality of protection units and a plurality of inverter units. For any protection unit, when a voltage at an input terminal of the protection unit is greater than a voltage at an output terminal of the protection unit, a path between the input terminal and the output terminal of the protection unit is in a forward conducted state; when the voltage at the output terminal of the protection unit is greater than the voltage at the input terminal voltage of the protection unit, the path between the input terminal and the output terminal of the protection unit is in a reverse cut-off state; and when a control terminal of the protection unit receives a first trigger signal, the path between the input terminal and the output terminal of the protection unit is in a reverse conducted state.

16 Claims, 13 Drawing Sheets

(51) Int. Cl.
*H02M 1/32* (2007.01)
*H02M 7/493* (2007.01)

(56) References Cited

U.S. PATENT DOCUMENTS

| | | | |
|---|---|---|---|
| 11,353,487 B2* | 6/2022 | Yin | G01R 27/2605 |
| 2007/0291522 A1* | 12/2007 | Toba | H02M 7/487 |
| | | | 363/131 |
| 2015/0069841 A1 | 3/2015 | Falk et al. | |
| 2016/0248259 A1* | 8/2016 | Berger | H02J 3/32 |
| 2018/0083571 A1* | 3/2018 | Xu | H02M 7/493 |

FOREIGN PATENT DOCUMENTS

| | | |
|---|---|---|
| CN | 103606953 A | 2/2014 |
| CN | 102395758 B | 7/2014 |
| CN | 103983891 A | 8/2014 |
| CN | 104660025 A | 5/2015 |
| CN | 205646843 U | 10/2016 |
| CN | 104167799 B | 10/2017 |
| CN | 104836321 B | 11/2017 |
| CN | 105723519 B | 12/2017 |
| CN | 108039732 A | 5/2018 |
| CN | 207304022 U | 5/2018 |
| CN | 108964506 A | 12/2018 |
| CN | 109088430 A | 12/2018 |
| CN | 110071525 A | 7/2019 |
| CN | 110429644 A | 11/2019 |
| KR | 20130071913 A | 7/2013 |
| KR | 20190061608 A | 6/2019 |
| WO | 2016191264 A1 | 12/2016 |
| WO | 2019042551 A1 | 3/2019 |

\* cited by examiner

INVERTER APPARATUS AND POWER SUPPLY SYSTEM

CROSS-REFERENCE TO RELATED APPLICATIONS

This application is a continuation of International Application No. PCT/CN2020/098207, filed on Jun. 24, 2020, which claims priority to Chinese Patent Application No. 201910703078.2, filed on Jul. 31, 2019, The disclosures of the aforementioned applications are hereby incorporated by reference in their entireties.

TECHNICAL FIELD

This application relates to the field of power technologies, and in particular, to an inverter apparatus and a power supply system.

BACKGROUND

In a power supply system that is based on a photovoltaic power grid, an inverter apparatus is used to convert a direct current generated by a direct current source such as a photovoltaic cell into an alternating current, and send the alternating current obtained through conversion to a power grid of a power utilization system. Because the direct current generated by the direct current source such as the photovoltaic cell is intermittent, the inverter apparatus needs to process the direct current generated by this type of direct current source, so that the power grid can obtain an alternating current with stable power.

SUMMARY

This application provides an inverter apparatus and a power supply system, to improve power supply stability of the power supply system. The technical solutions are as follows.

According to one aspect, an inverter apparatus is provided. The inverter apparatus includes a plurality of protection units and a plurality of inverter units. The protection unit may be a circuit that can implement fault isolation, and the inverter unit may be a circuit that can implement conversion of an electric current between a direct current and an alternating current.

Each of the plurality of protection units includes an input terminal, an output terminal, and a control terminal. Each of the plurality of inverter units includes a direct current input terminal and an alternating current output terminal. The input terminal of each protection unit is configured to connect to one of a plurality of direct current source units in a power supply system, the output terminal of each protection unit is connected to the direct current input terminal of one of the plurality of inverter units, and the alternating current output terminal of each inverter unit is configured to connect to a power grid. The input terminals of the plurality of protection units are configured to connect to a same energy storage system.

Any one of the plurality of protection units is configured to: when a voltage at the input terminal of the any protection unit is greater than a voltage at the output terminal of the any protection unit, a path between the input terminal of the any protection unit and the output terminal of the any protection unit is in a forward conducted state; when a voltage at the output terminal of the any protection unit is greater than a voltage at the input terminal of the any protection unit, a path between the input terminal of the protection unit and the output terminal of the protection unit is in a reverse cut-off state; or when the control terminal of the any protection unit receives a first trigger signal, a path between the input terminal of the protection unit and the output terminal of the protection unit is in a reverse conducted state.

The inverter apparatus provided in this application has at least the following several effects:

First, the inverter units, each of which is connected to one protection unit in series, are connected in parallel. In this way, the inverter units may share one energy storage system. Compared with that each inverter unit is connected to one energy storage system, an inverter apparatus shown in FIG. 2 can reduce hardware costs of a power supply system.

Second, the inverter units share one energy storage system, which is equivalent to that the input terminals of the protection units are connected to the energy storage system after being connected in parallel. In this case, if an inverter unit is short-circuited, the inverter unit becomes a point with a lowest electric potential in an entire circuit. In this case, energy in another inverter unit is intended to flow back into the inverter unit. However, because paths between input terminals of the protection units and output terminals of the protection units are in the reverse cut-off state in this case, the energy in the another inverter unit is blocked from flowing back into the inverter unit. For the inverter unit, if energy back-flowing occurs when the inverter unit operates properly, a backflow current generated in an energy back-flowing process is usually comparatively large, and exceeds a normal operating range of the inverter unit, consequently resulting in damage to the inverter unit. Therefore, when an inverter unit is short-circuited, another inverter unit can be isolated, thereby avoiding damage to the other inverter units.

Third, if a bus between a direct current source unit and a protection unit is short-circuited, an input terminal of the protection unit becomes a point with a lowest electric potential in an entire circuit. In this case, energy in each inverter unit is intended to flow back into the point with the lowest electric potential. However, because paths between input terminals of the protection units and output terminals of the protection units are in the reverse cut-off state in this case, the energy in each inverter unit is blocked from flowing back into the point with the lowest electric potential. That is, when a bus between a direct current source unit and an inverter apparatus is short-circuited, each inverter unit can be isolated, thereby avoiding damage to each inverter unit.

In a possible example, each protection unit includes a diode and a power switch. An anode of the diode is configured to connect to a direct current source unit, a cathode of the diode is connected to a direct current input terminal of an inverter unit, the anode of the diode is connected to a cathode of the power switch, and the cathode of the diode is connected to an anode of the power switch.

The inverter apparatus further includes a controller. A first control terminal of the controller is connected to a control electrode of each power switch. The first control terminal of the controller is configured to output the first trigger signal. When receiving the first trigger signal, each power switch controls a path between the anode of the power switch and the cathode of the power switch to be in a conducted state.

A function of the protection unit provided in this embodiment of this application can be implemented by using the diode and the power switch, thereby reducing hardware costs of the inverter apparatus.

In a possible example, the inverter apparatus further includes a plurality of direct current-direct current converters. An input terminal of each direct current-direct current converter is connected to a direct current source unit, an output terminal of each direct current-direct current converter is connected to the anode of the diode, and a control terminal of each direct current-direct current converter is connected to a second control terminal of the controller.

The second control terminal of the controller is configured to output a second trigger signal. When receiving the second trigger signal, each direct current-direct current converter increases an output voltage to enable a diode connected to each direct current-direct current converter to be in a conducted state.

By using the foregoing configuration, it can be implemented that the power switch in the protection unit is turned on in a zero-voltage scenario, thereby avoiding damage to the power switch caused by a surge current generated at an instant at which the power switch is turned on.

In a possible example, each protection unit includes a first protection unit, and the direct current input terminal of each inverter unit includes a positive bus input terminal and a negative bus input terminal.

An input terminal of each first protection unit is configured to connect to a positive bus output terminal of a direct current source unit, an output terminal of each first protection unit is connected to the positive bus input terminal of an inverter unit, and the negative bus input terminal of each inverter unit is connected to a negative bus output terminal of a direct current source unit.

The input terminal of each first protection unit is further configured to connect to a positive bus input terminal of the energy storage system, and the negative bus input terminal of each inverter unit is further configured to connect to a negative bus input terminal of the energy storage system.

In a possible example, each protection unit includes a second protection unit, and the direct current input terminal of each inverter unit includes a positive bus input terminal and a negative bus input terminal.

An input terminal of each second protection unit is configured to connect to a negative bus output terminal of a direct current source unit, an output terminal of each second protection unit is connected to the negative bus input terminal of an inverter unit, and the positive bus input terminal of each inverter unit is connected to a positive bus output terminal of a direct current source unit.

The input terminal of each second protection unit is further configured to connect to a negative bus input terminal of the energy storage system, and the positive bus input terminal of each inverter unit is further configured to connect to a positive bus input terminal of the energy storage system.

In a possible example, each protection unit includes a first protection unit and a second protection unit, and the direct current input terminal of each inverter unit includes a positive bus input terminal and a negative bus input terminal.

An input terminal of each first protection unit is configured to connect to a positive bus output terminal of a direct current source unit, and an output terminal of each first protection unit is connected to a positive bus input terminal of an inverter unit.

An input terminal of each second protection unit is configured to connect to a negative bus output terminal of a direct current source unit, and an output terminal of each second protection unit is connected to a negative bus input terminal of an inverter unit.

The input terminal of each first protection unit is further configured to connect to a positive bus input terminal of the energy storage system, and the input terminal of each second protection unit is further configured to connect to a negative bus input terminal of the energy storage system.

By using the foregoing three different configurations, the protection unit provided in this embodiment of this application can be configured on a positive-bus side, can be configured on a negative-bus side, or can be configured on two buses, thereby improving application flexibility of the inverter apparatus.

In a possible example, the inverter apparatus further includes a plurality of first capacitors, one terminal of each first capacitor is connected to an input terminal of a protection unit, and the other terminal of each first capacitor is connected to a bus that is of two buses and that is not a bus on which the plurality of protection units are deployed. The first capacitor may suppress a surge current to be input into the protection unit.

In a possible example, the inverter apparatus further includes a plurality of second capacitors, one terminal of each second capacitor is connected to an output terminal of a protection unit, and the other terminal of each second capacitor is connected to the bus that is of the two buses and that is not the bus on which the plurality of protection units are deployed. The second capacitor may reduce a surge current generated at a power-on instant.

In a possible example, each inverter unit includes one or a plurality of inverters, the plurality of inverters are connected in parallel, and two power components connected in series are deployed on a bus of each inverter. For any inverter, the controller is further configured to input a third trigger signal to a power component on a bus of any inverter, to detect a voltage on the bus and diagnose, based on the voltage on the bus, whether the other power component connected to the power component in series is short-circuited.

In this application, fault detection can also be performed on the inverter in the inverter unit, thereby further improving application flexibility of the inverter apparatus.

According to another aspect, a power supply system is provided. The power supply system includes a plurality of direct current source units, an energy storage system, and any one of the foregoing inverter apparatuses. Each direct current source unit is connected to an input terminal of a protection unit, an output terminal of each protection unit is connected to a direct current input terminal of an inverter unit, and an alternating current output terminal of each inverter unit is configured to connect to a power grid, to provide an alternating current to the power grid. An input terminal of each protection unit is further connected to the energy storage system.

DESCRIPTION OF EMBODIMENTS

To make the objectives, technical solutions, and advantages of this application clearer, the following further describes the implementations of this application in detail with reference to the accompanying drawings.

Before the embodiments of this application are described in detail, an application scenario in the embodiments of this application is described.

Figure 1:
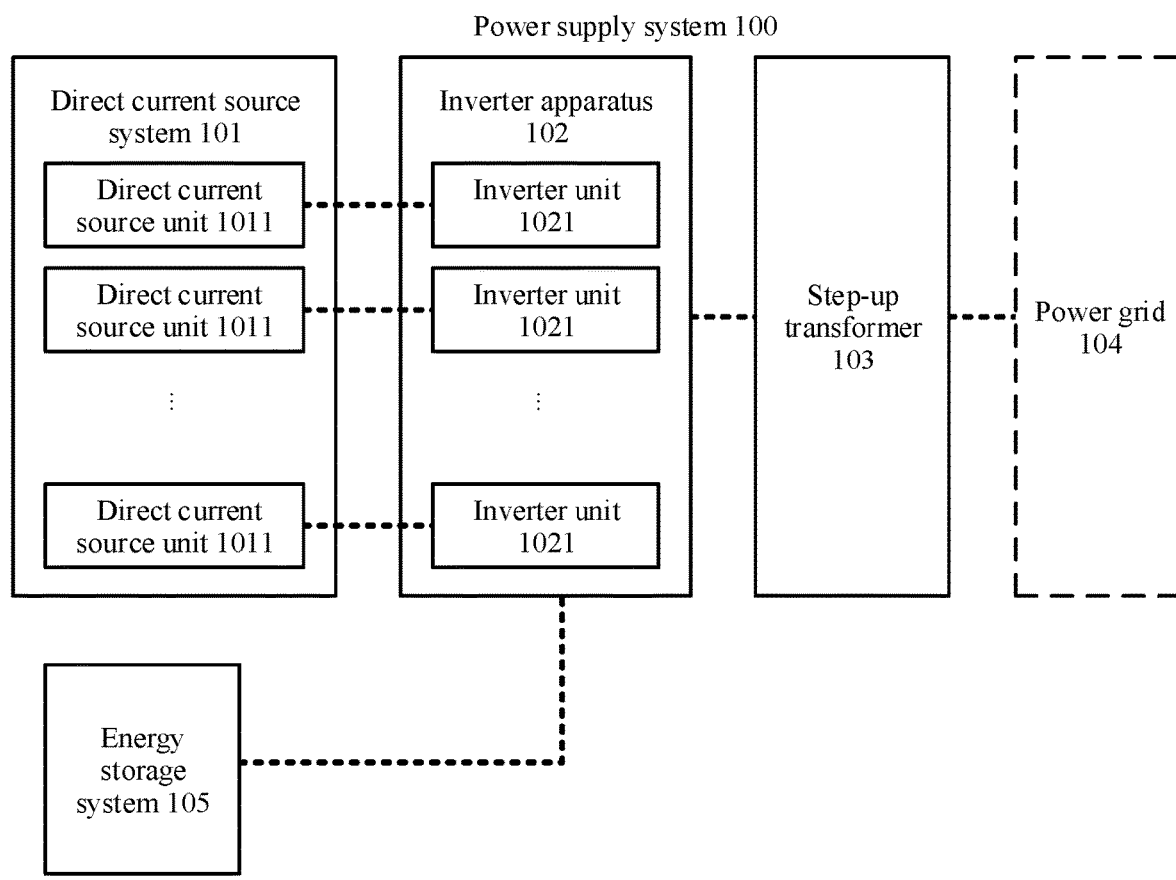
FIG. 1 is a schematic structural diagram of a power supply system according to an embodiment of this application.

FIG. 1 is a schematic structural diagram of a power supply system according to an embodiment of this application. As shown in FIG. 1, the power supply system 100 includes a direct current source system 101, an inverter apparatus 102, and a step-up transformer 103. The direct current source system 101 is connected to the inverter apparatus 102, the inverter apparatus 102 is connected to the step-up transformer 103, and the step-up transformer 103 is configured to connect to a power grid 104.

The direct current source system 101 includes a plurality of direct current source units 1011, each direct current source unit 1011 includes one or a plurality of direct current sources, the plurality of direct current sources in each direct current source unit 1011 are connected in parallel, and any direct current source is configured to provide a direct current. The direct current source may be a device such as a photovoltaic cell or a wind energy battery. In a photovoltaic field, a direct current source included in a direct current source unit may also be referred to as a photovoltaic cell panel.

Because the direct current source system 101 includes the plurality of direct current source units 1011, the inverter apparatus 102 includes inverter units 1021 each of which is connected to each of the plurality of direct current source units 1011. The inverter unit 1021 is configured to convert a direct current output by the direct current source unit 101 into an alternating current, and feed the alternating current obtained through conversion to the power grid 104 by using the step-up transformer 103.

Each inverter unit 1021 includes one or a plurality of inverters, and the plurality of inverters are connected in parallel.

The power grid 104 is configured to obtain electricity from electricity output by the step-up transformer 103. A power at which the power grid 104 obtains electricity from the electricity output by the step-up transformer 103 may also be referred to as a grid-tied power. When the power supply system shown in FIG. 1 is used, the grid-tied power of the power grid 104 is constant. However, an output power of the direct current source unit 1011 included in the direct current source system 101 is usually unstable. For example, an output power of the photovoltaic cell during the daytime is different from an output power of the photovoltaic cell at night. Therefore, to ensure stability of the grid-tied power of the power grid 104, as shown in FIG. 1, the power supply system 100 further includes an energy storage system 105. The energy storage system 105 is connected to the inverter apparatus 102.

When an output power of the direct current source system 101 is less than the grid-tied power required by the power grid 104, the energy storage system 105 may supplement the power grid 104 with electric energy by using the inverter apparatus 102. When an output power of the direct current source system 101 is greater than the grid-tied power required by the power grid 104, the energy storage system 105 may store, by using the inverter apparatus 102, electric energy remaining after the power grid 104 obtains electricity.

Stability of the grid-tied power of the power grid 104 can be ensured by using the energy storage system 105. An inverter apparatus and a power supply system that are provided in the embodiments of this application are used in the foregoing scenario in which stability of the grid-tied power of the power grid 104 is maintained by using the energy storage system 105.

Figure 2:
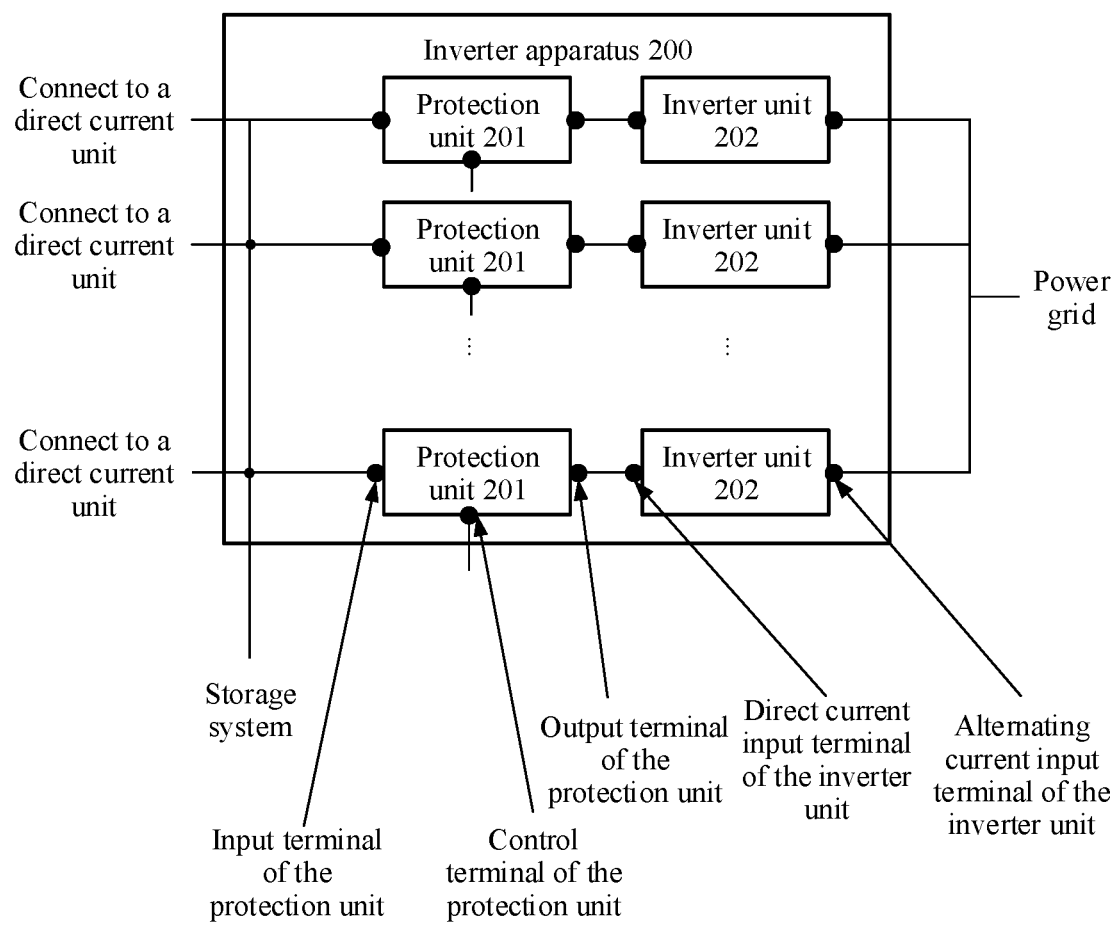
FIG. 2 is a schematic structural diagram of an inverter apparatus according to an embodiment of this application.

FIG. 2 shows an inverter apparatus provided in an embodiment of this application. As shown in FIG. 2, the inverter apparatus 200 includes a plurality of protection units 201 and a plurality of inverter units 202.

As shown in FIG. 2, each protection unit 201 includes an input terminal, an output terminal, and a control terminal, and each inverter unit 202 includes a direct current input terminal and an alternating current output terminal.

The input terminal of each protection unit 201 is configured to connect to one of a plurality of direct current source units in a power supply system, the output terminal of each protection unit 201 is connected to a direct current input terminal of one of the plurality of inverter units 202, and the alternating current output terminal of each inverter unit 202 is configured to connect to a power grid.

The input terminals of the plurality of protection units 201 are configured to connect to a same energy storage system.

Any protection unit 201 is configured to: when a voltage at the input terminal of the protection unit 201 is greater than a voltage at the output terminal of the protection unit 201, a path between the input terminal of the protection unit 201 and the output terminal of the protection unit 201 is in a forward conducted state; when a voltage at the output terminal of the protection unit 201 is greater than a voltage at the input terminal of the protection unit 201, a path between the input terminal of the protection unit 201 and the output terminal of the protection unit 201 is in a reverse cut-off state; or when the control terminal of the protection unit 201 receives a first trigger signal, a path between the input terminal of the protection unit 201 and the output terminal of the protection unit 201 is in a reverse conducted state.

When being used in the power supply system shown in FIG. 1, the inverter apparatus shown in FIG. 2 has at least the following technical effects:

In the inverter apparatus shown in FIG. 2, the inverter units, each of which is connected to one protection unit in series, are connected in parallel. In this way, the inverter units may share one energy storage system. Compared with that each inverter unit is connected to one energy storage system, the inverter apparatus shown in FIG. 2 can reduce hardware costs of the power supply system.

Figure 3:
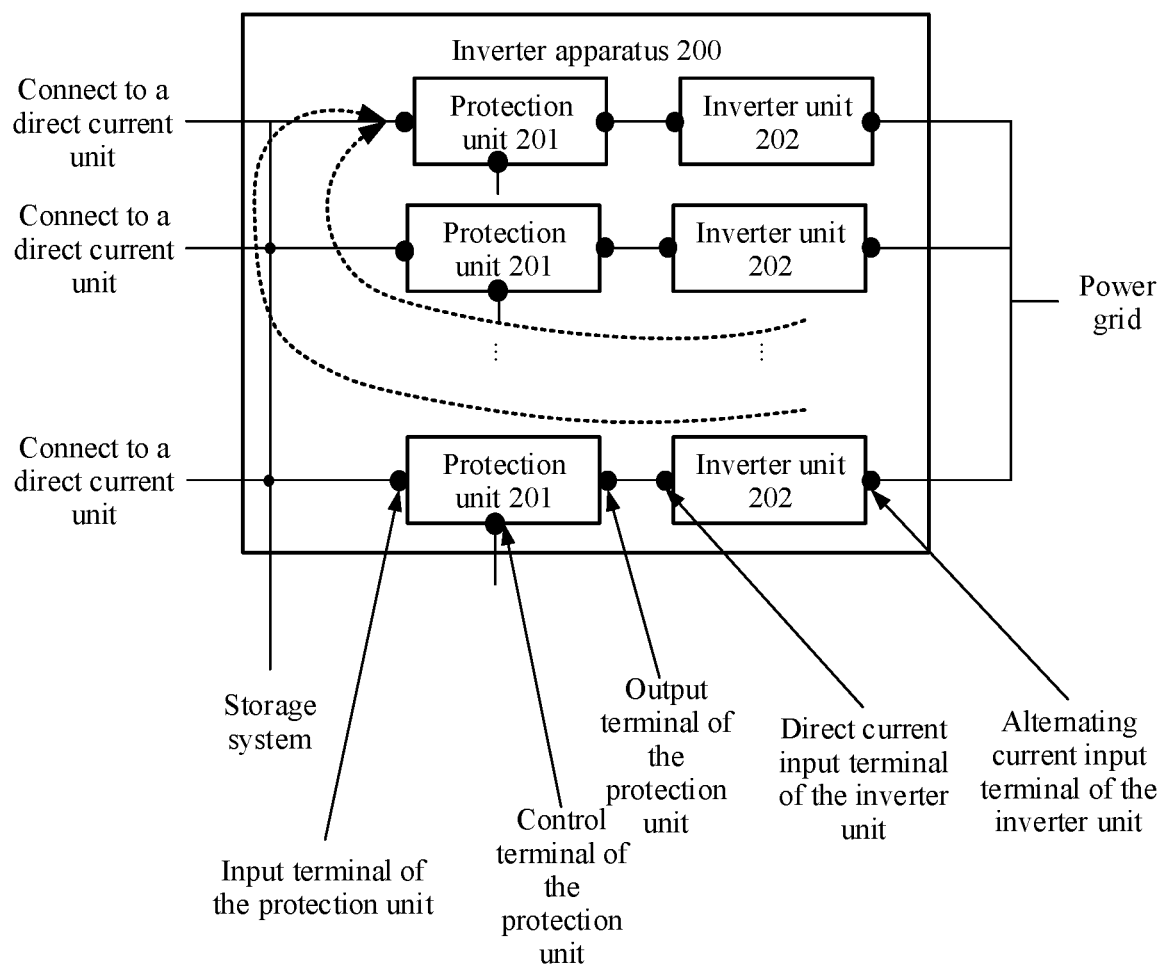
FIG. 3 is a schematic diagram of an energy back-flowing case according to an embodiment of this application.

In addition, the inverter units share one energy storage system, which is equivalent to that the input terminals of the protection units are connected to the energy storage system after being connected in parallel. In this case, if an inverter unit is short-circuited, the inverter unit becomes a point with a lowest electric potential in an entire circuit. In this case, as shown in FIG. 3, energy in another inverter unit is intended to flow back into the inverter unit. However, because paths between input terminals of the protection units and output terminals of the protection units are in the reverse cut-off state in this case, the energy in the another inverter unit is blocked from flowing back into the inverter unit. For the inverter unit, if energy back-flowing occurs when the inverter unit operates properly, a backflow current generated in an energy back-flowing process is usually comparatively large, and exceeds a normal operating range of the inverter unit, consequently resulting in damage to the inverter unit. Therefore, in the inverter apparatus shown in FIG. 2, when an inverter unit is short-circuited, another inverter unit can be isolated, thereby avoiding damage to the another inverter unit.

Figure 4:
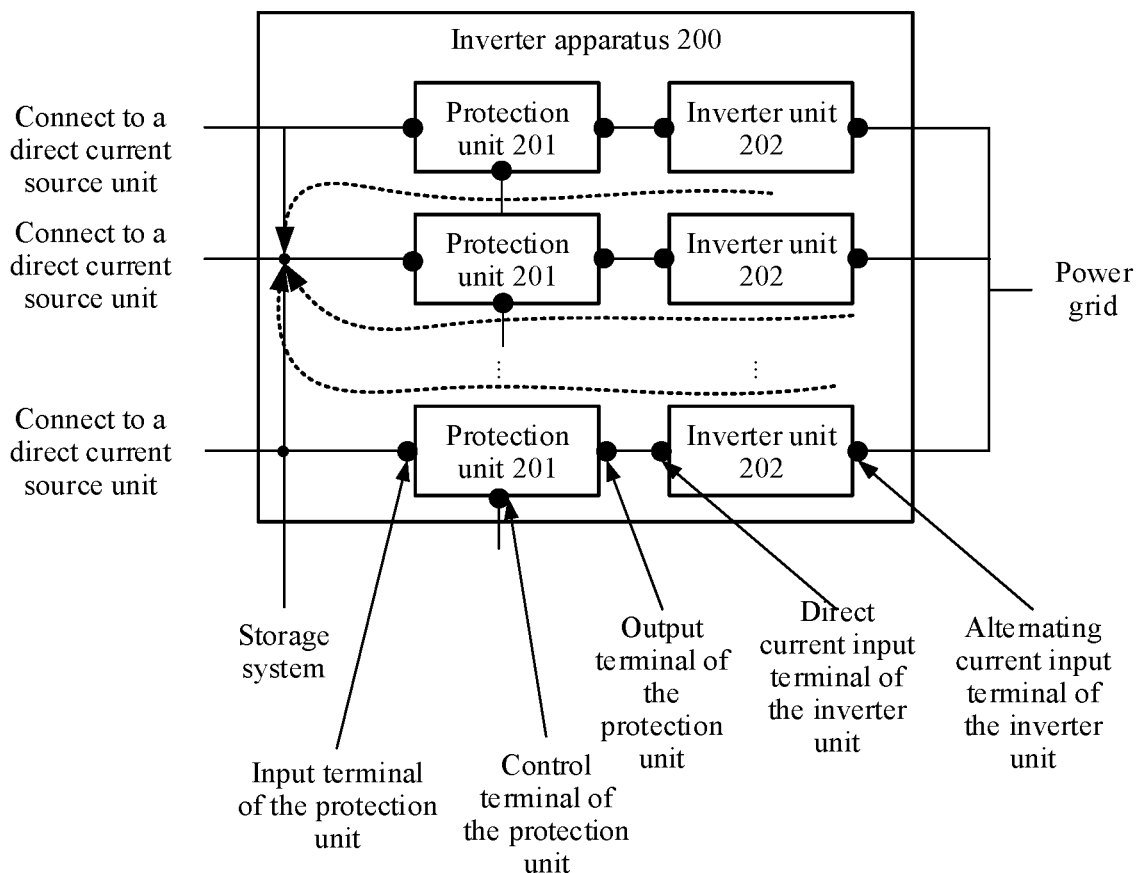
FIG. 4 is a schematic diagram of another energy back-flowing case according to an embodiment of this application.

In addition, if a bus between a direct current source unit and a protection unit is short-circuited, an input terminal of the protection unit becomes a point with a lowest electric potential in an entire circuit. In this case, as shown in FIG. 4, energy in each inverter unit is intended to flow back into the point with the lowest electric potential. However, because paths between input terminals of the protection units and output terminals of the protection units are in the reverse cut-off state in this case, the energy in each inverter unit is blocked from flowing back into the point with the lowest electric potential. That is, in the inverter apparatus shown in FIG. 2, when a bus between a direct current source unit and the inverter apparatus is short-circuited, each inverter unit can be isolated, thereby avoiding damage to each inverter unit.

Figure 5:
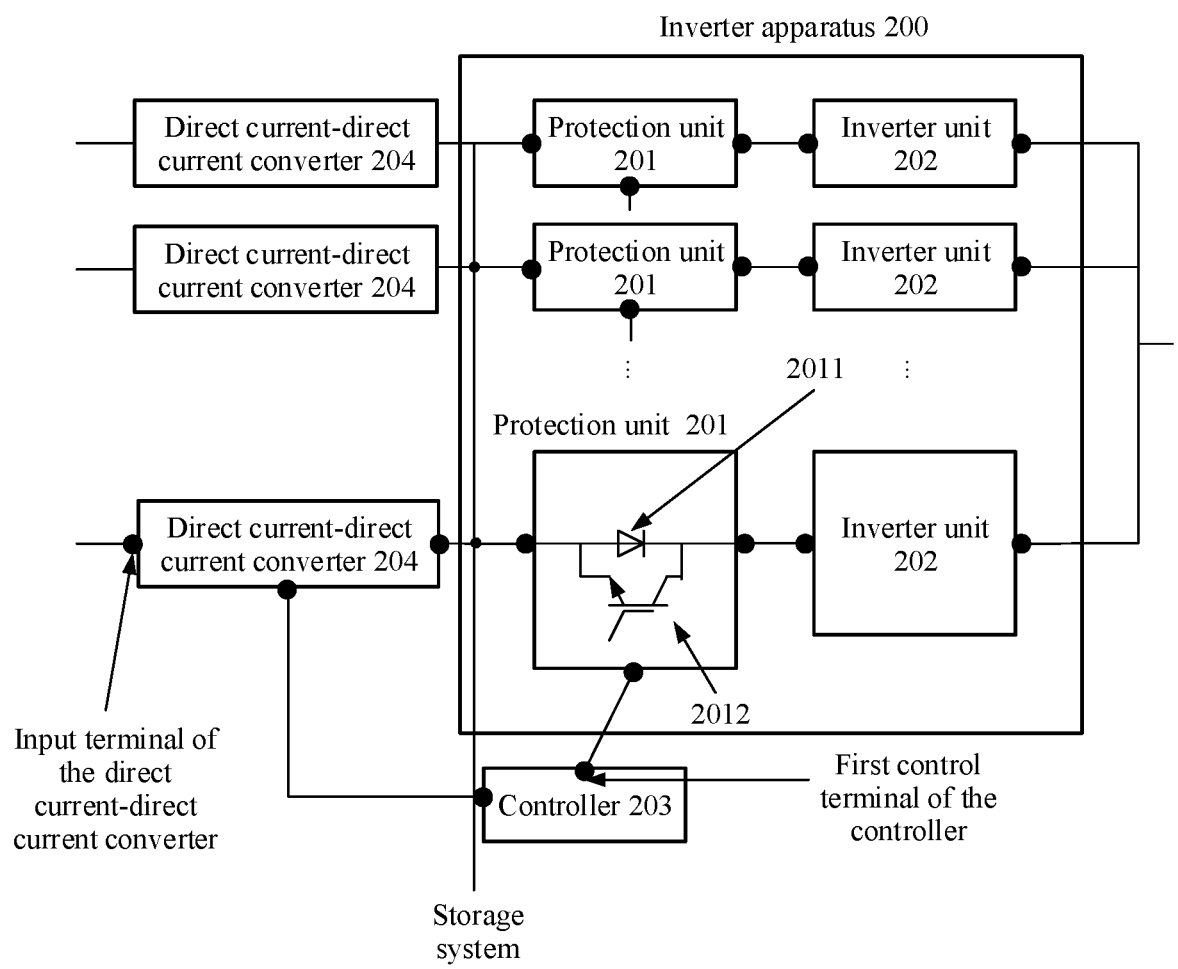
FIG. 5 is a schematic structural diagram of another inverter apparatus according to an embodiment of this application.

FIG. 5 is a schematic structural diagram of another inverter apparatus according to an embodiment of this application, and is used for a further detailed description of the inverter apparatus shown in FIG. 2. As shown in FIG. 5, each protection unit 201 in the inverter apparatus 200 includes a diode 2011 and a power switch 2012.

As shown in FIG. 5, an anode of the diode 2011 is configured to connect to a direct current source unit, a cathode of the diode 2011 is connected to a direct current input terminal of an inverter unit 202, the anode of the diode 2011 is connected to a cathode of the power switch 2012, and the cathode of the diode 2011 is connected to an anode of the power switch 2012.

As shown in FIG. 5, the inverter apparatus may further include a controller 203. A first control terminal of the controller 203 is connected to a control electrode of each power switch 2012. The first control terminal of the controller 203 is configured to output the first trigger signal. When receiving the first trigger signal, each power switch 2012 controls a path between the anode of the power switch 2012 and the cathode of the power switch 2012 to be in a conducted state.

In other words, in this embodiment of this application, the protection unit may be implemented by using a diode and a power switch. When the direct current source unit and/or the energy storage system supply/supplies power to the power grid by using the inverter unit, the diode in the protection unit is in the conducted state. When the power grid needs to store energy in the energy storage system, the diode in the protection unit is reversely cut off. In this case, the controller may output the first trigger signal, to control the power switch to be turned on.

In addition, if there is a voltage difference between two terminals of the power switch 2012 at an instant at which the power switch 2012 in the protection unit 201 is turned on, there is a surge current at the instant at which the power switch 2012 is turned on. The surge current increases thermal stress of the power switch 2012, consequently causing some damage to the power switch 2012. Therefore, in this embodiment of this application, the inverter apparatus 200 shown in FIG. 5 further includes a plurality of direct current-direct current converters 204. An input terminal of each direct current-direct current converter 204 is connected to a direct current source unit, an output terminal of each direct current-direct current converter 204 is connected to the anode of the diode 2011, and a control terminal of each direct current-direct current converter 204 is connected to a second control terminal of the controller 203.

The second control terminal of the controller 203 is configured to output a second trigger signal. When receiving the second trigger signal, each direct current-direct current converter 204 increases an output voltage to enable a diode connected to each direct current-direct current converter 204 to be in a conducted state. In this case, that the first control terminal of the controller 203 is configured to output the first trigger signal is specifically: The controller 203 outputs the second trigger signal after outputting the first trigger signal.

Because the controller 203 outputs the second trigger signal after outputting the first trigger signal, the diode 2011 is already conducted before the power switch 2012 is turned on. In this case, voltages at the two terminals of the power switch 2012 are almost 0. If the power switch 2012 is turned on by using the second trigger signal in this case, there is basically no surge current at an instant at which the power switch 2012 is turned on, thereby avoiding damage to the power switch 2012 at the turn-on instant. This manner of turning on the power switch 2012 may also be referred to as a zero-voltage turn-on mode.

In the inverter apparatus shown in FIG. 5, the power switch 2012 may include at least any one of an insulated gate bipolar transistor (IGBT), a metal-oxide-semiconductor field-effect transistor (MOSFET), a silicon controlled rectifier (SCR), or a gate turn-off thyristor (GTO).

When the power switch 2012 is an IGBT, a gate of the IGBT is used as a control electrode, an emitter of the IGBT is used as an anode, and a collector of the IGBT is used as a cathode. When the power switch 2012 is a MOSFET, a gate of the MOSFET is used as a control electrode, a source of the MOSFET is used as an anode, and a drain of the MOSFET is used as a cathode. When the power switch 2012 is a power switch of another type, three electrodes of the power switch 2012 may be set with reference to the foregoing manners, and details are not described herein one by one.

In addition, the controller 203 shown in FIG. 5 may be a controller integrated in the inverter apparatus 200, or may be a controller independent of the inverter apparatus. In addition, the plurality of direct current-direct current converters 204 in FIG. 5 may be direct current-direct current converters integrated in the inverter apparatus 200, or may be direct current-direct current converters independent of the inverter apparatus. FIG. 5 is merely used as an example for description, and does not constitute a limitation on this application.

For the power supply system shown in FIG. 1, transmission of electric energy between the direct current source unit and the inverter unit requires a positive bus and a negative bus. In other words, each direct current source unit includes a positive bus output terminal and a negative bus output terminal, and the direct current input terminal of each inverter unit includes a positive bus input terminal and a negative bus input terminal. The positive bus output terminal of the direct current source unit is connected to the positive bus input terminal of the inverter unit by using the positive bus, and the negative bus output terminal of the direct current source unit is connected to the negative bus input terminal of the inverter unit by using the negative bus. Based on this scenario, the protection unit in the inverter apparatus in FIG. 2 may be deployed on a positive-bus side, or may be deployed on a negative-bus side. The following separately describes both cases in detail.

Figure 6:
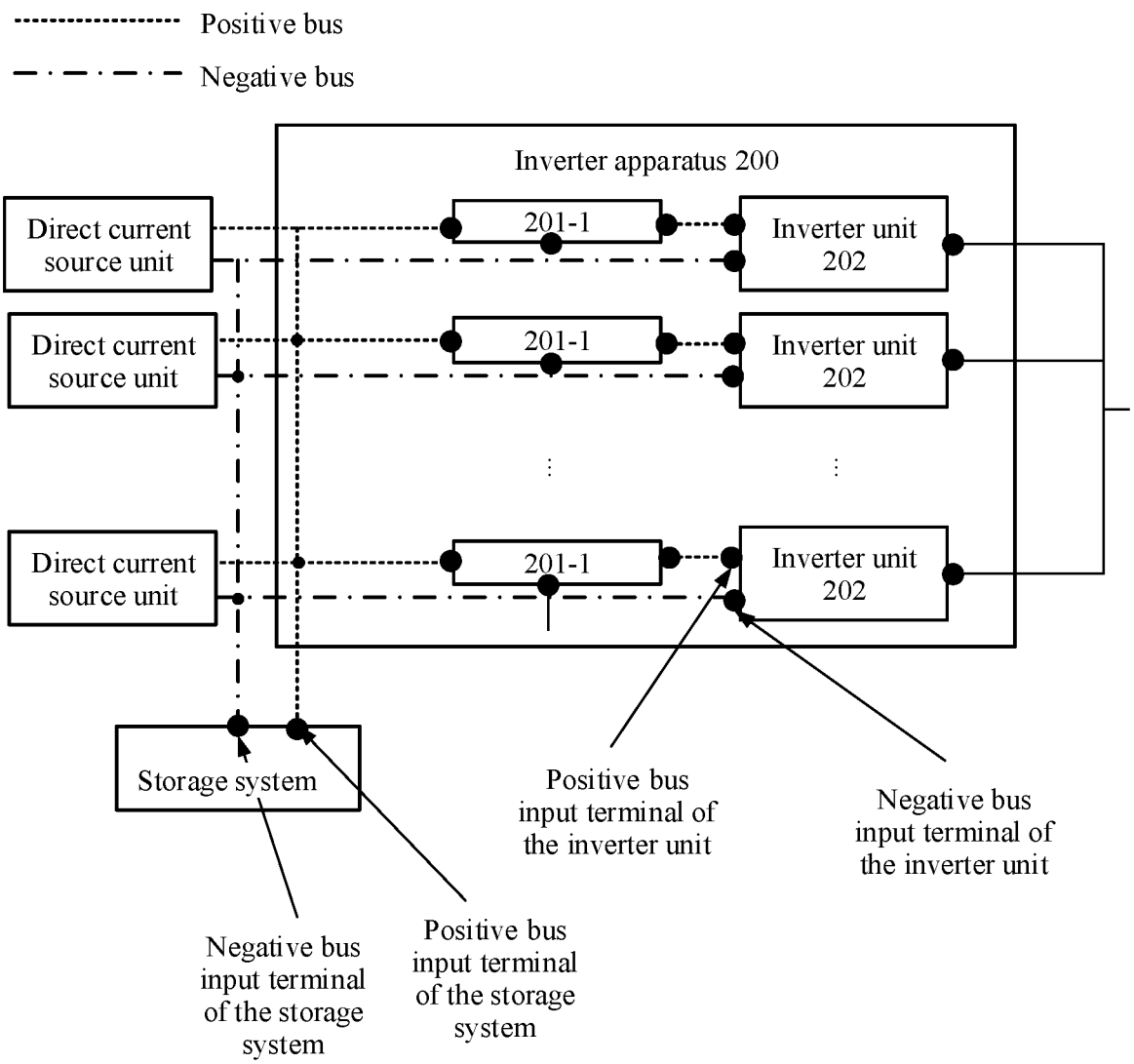
FIG. 6 is a schematic structural diagram of another inverter apparatus according to an embodiment of this application.

FIG. 6 is a schematic structural diagram of another inverter apparatus according to an embodiment of this application. As shown in FIG. 6, each protection unit includes a first protection unit 201-1, and a direct current input terminal of an inverter unit includes a positive bus input terminal and a negative bus input terminal. For ease of description, a positive bus and a negative bus in FIG. 6 are identified by using different line types.

As shown in FIG. 6, an input terminal of each first protection unit 201-1 is configured to connect to a positive bus output terminal of a direct current source unit, an output terminal of each first protection unit 201-1 is connected to a positive bus input terminal of an inverter unit 202, and a negative bus input terminal of each inverter unit 202 is connected to a negative bus output terminal of a direct current source unit.

The input terminal of each first protection unit 201-1 is further configured to connect to a positive bus input terminal of an energy storage system 203, and the negative bus input terminal of each inverter unit 202 is further configured to connect to a negative bus input terminal of the energy storage system 203.

In other words, in the inverter apparatus 200 shown in FIG. 6, the first protection unit 201-1 is deployed on a positive-bus side, and is configured to perform fault isolation when an inverter unit 202 or a bus is short-circuited.

Figure 7:
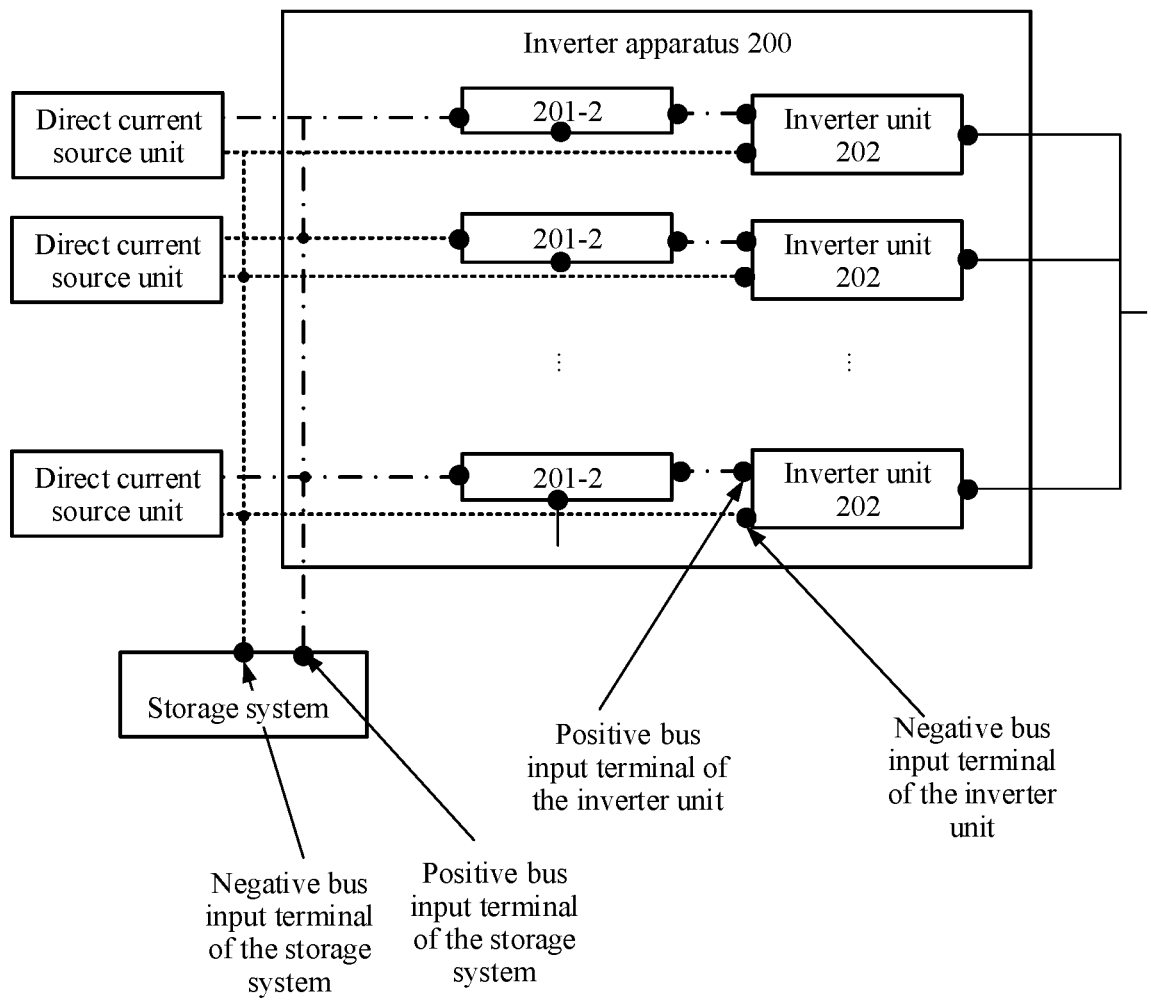
FIG. 7 is a schematic structural diagram of another inverter apparatus according to an embodiment of this application.

FIG. 7 is a schematic structural diagram of another inverter apparatus according to an embodiment of this application. As shown in FIG. 7, each protection unit includes a second protection unit 201-2, and a direct current input terminal of an inverter unit includes a positive bus input terminal and a negative bus input terminal.

An input terminal of each second protection unit 201-2 is configured to connect to a negative bus output terminal of a direct current source unit, an output terminal of each second protection unit 201-2 is connected to a negative bus input terminal of an inverter unit 202, and a positive bus input terminal of each inverter unit 202 is connected to a positive bus output terminal of a direct current source unit.

The input terminal of each second protection unit 201-2 is further configured to connect to a negative bus input terminal of an energy storage system 203, and the positive bus input terminal of each inverter unit 202 is further configured to connect to a positive bus input terminal of the energy storage system 203.

In other words, in the inverter apparatus 200 shown in FIG. 7, the second protection unit is deployed on a negative-bus side, and is configured to perform fault isolation when an inverter unit or a bus is short-circuited.

Figure 8:
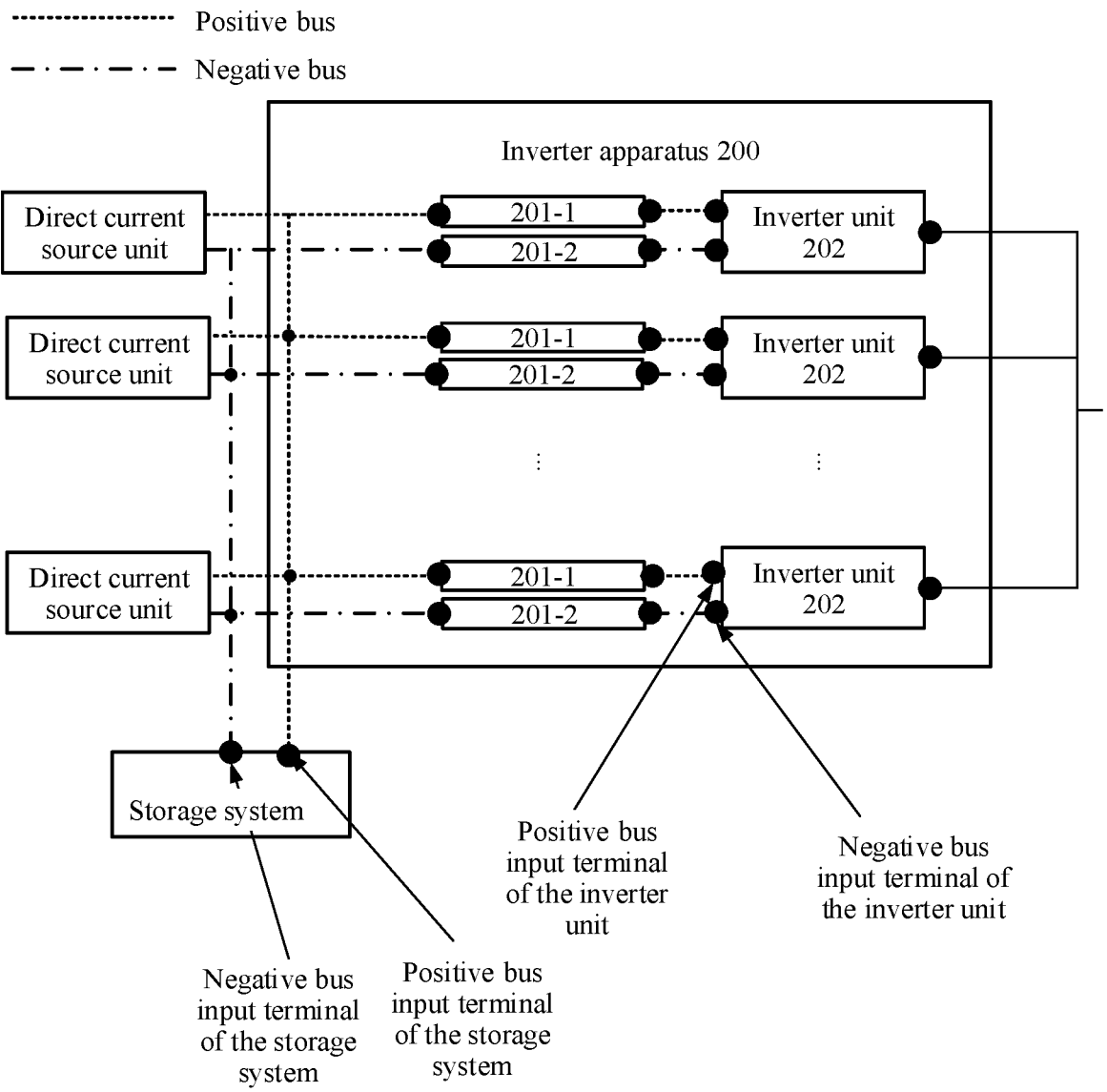
FIG. 8 is a schematic structural diagram of another inverter apparatus according to an embodiment of this application.

FIG. 8 is a schematic structural diagram of another inverter apparatus according to an embodiment of this application. As shown in FIG. 8, each protection unit includes a first protection unit 201-1 and a second protection unit 201-2, and a direct current input terminal of an inverter unit includes a positive bus input terminal and a negative bus input terminal.

An input terminal of each first protection unit 201-1 is configured to connect to a positive bus output terminal of a direct current source unit, and an output terminal of each first protection unit 201-1 is connected to a positive bus input terminal of an inverter unit 202.

An input terminal of each second protection unit 201-2 is configured to connect to a negative bus output terminal of a direct current source unit, and an output terminal of each second protection unit 201-2 is connected to a negative bus input terminal of an inverter unit 202.

The input terminal of each first protection unit 201-1 is further configured to connect to a positive bus input terminal of an energy storage system 203, and the input terminal of each second protection unit 201-2 is further configured to connect to a negative bus input terminal of the energy storage system 203.

In other words, in the inverter apparatus 200 shown in FIG. 8, the first protection unit is deployed on a positive-bus side, the second protection unit is deployed on a negative-bus side, and the first protection unit and the second protection unit are configured to perform fault isolation when an inverter unit or a bus is short-circuited.

For a case in which there are a plurality of direct current source units in a power supply system, deploying a protection unit on one of two buses may result in a difference between a voltage change on a positive-bus side and a voltage change on a negative-bus side. Based on this factor, protection units may be deployed on both the positive bus and the negative bus.

For structures of the first protection unit 201-1 and the second protection unit 201-2 and a connection relationship between the first protection unit 201-1 and the second protection unit 201-2, refer to the protection unit shown in FIG. 5, and details are not described herein again.

Figure 9:
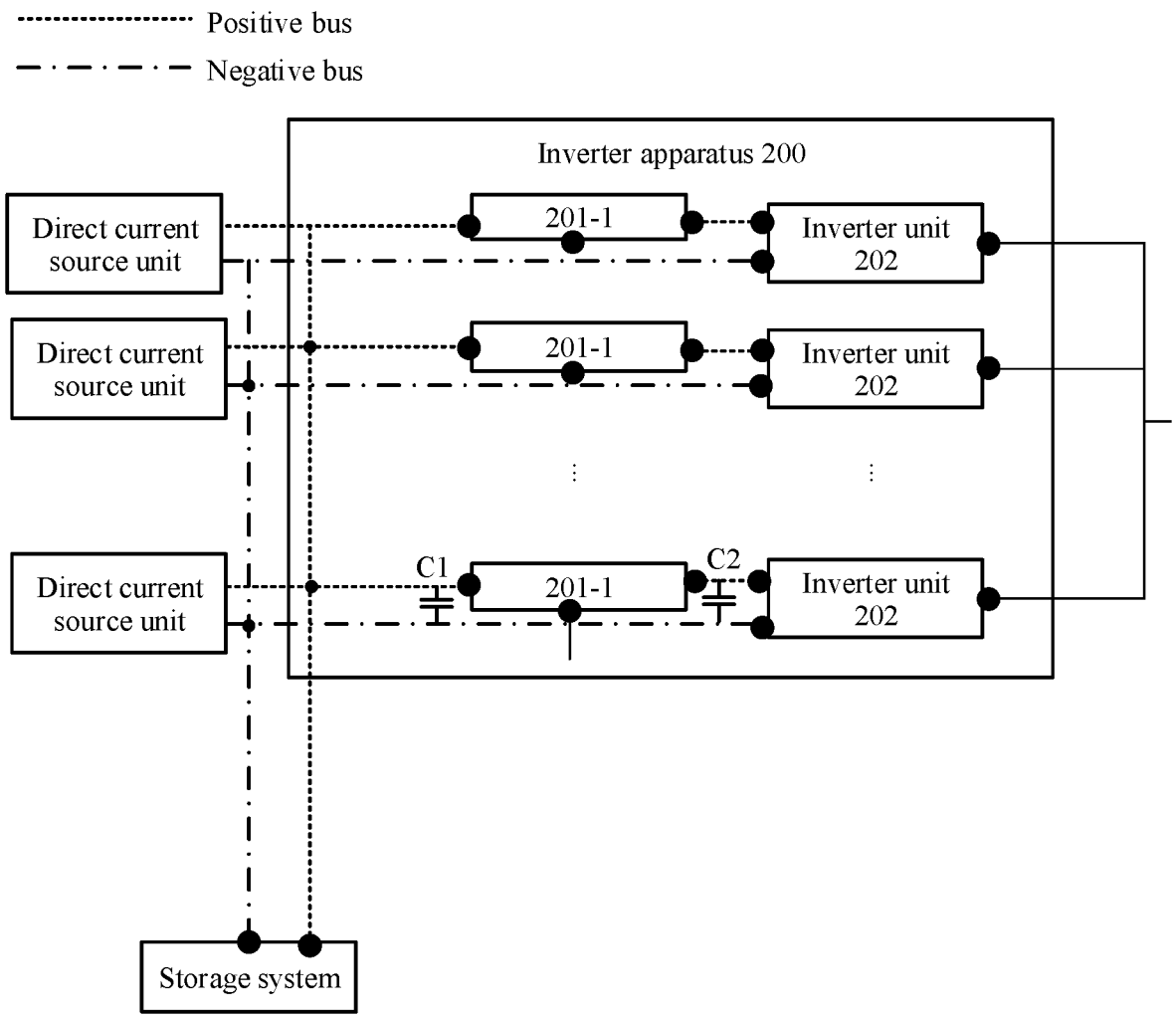
FIG. 9 is a schematic structural diagram of another inverter apparatus according to an embodiment of this application.

In the inverter apparatus shown in any one of FIG. 6 to FIG. 8, a capacitor may be further deployed on two sides of the protection unit 201. FIG. 9 is a schematic structural diagram of another inverter apparatus according to an embodiment of this application. As shown in FIG. 9, the inverter apparatus 200 further includes a plurality of first capacitors C1, one terminal of each first capacitor C1 is connected to an input terminal of a protection unit, and the other terminal of each first capacitor C1 is configured to connect to a bus that is of two buses and that is not a bus on which the protection unit is deployed. The first capacitor C1 may suppress a surge current to be input into the protection unit 201.

For the inverter apparatus shown in FIG. 9, for any first capacitor C1, one terminal of the first capacitor C1 is connected to an anode of a diode in a protection unit, and the other terminal of the first capacitor C1 is configured to connect to a bus that is of the two buses and that is not a bus on which the protection unit is deployed.

In addition, as shown in FIG. 9, the inverter apparatus 200 may further include a plurality of second capacitors C2. One terminal of each second capacitor C2 is connected to an output terminal of a protection unit, and the other end of each second capacitor C2 is configured to connect to a bus that is of the two buses and that is not a bus on which the protection unit is deployed. The second capacitor C2 may reduce a surge current generated at a power-on instant.

For the inverter apparatus shown in FIG. 9, for any second capacitor C2, one terminal of the second capacitor C2 is connected to a cathode of a diode in a protection unit, and the other end of the second capacitor C2 is configured to connect to a bus that is of the two buses and that is not a bus on which the protection unit is deployed.

The inverter apparatus shown in FIG. 9 is described by using an example in which the protection unit is deployed on a positive-bus side. For capacitor deployment in another protection unit deployment case, refer to the inverter apparatus shown in FIG. 9.

In this embodiment of this application, a power-on self-test operation may be further performed on the inverter apparatus, to check during startup whether the inverter apparatus has a fault. Each inverter unit in the foregoing embodiment includes one or a plurality of inverters, and the plurality of inverters are connected in parallel. The power-on self-test operation provided in this embodiment of this application is intended for any inverter. Because two power components connected in series are deployed on a bus of each inverter, for any inverter, a controller 203 is further configured to input a third trigger signal to one power component on a bus of any inverter, to detect a voltage on the bus, and diagnose, based on the voltage on the bus, whether the other power component connected to the power component in series is short-circuited.

Figure 10:
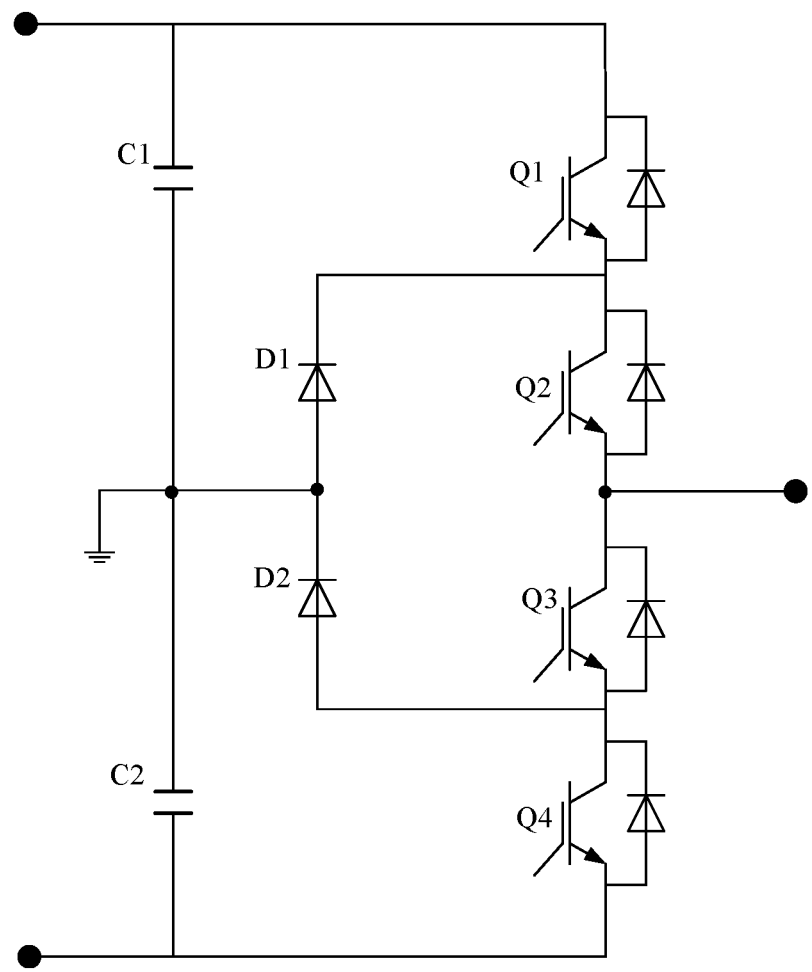
FIG. 10 is a schematic structural diagram of an inverter according to an embodiment of this application.

FIG. 10 is a schematic structural diagram of an inverter according to an embodiment of this application. As shown in FIG. 10, the inverter includes a first power switch Q1, a second power switch Q2, a third power switch Q3, a fourth power switch Q4, a first diode D1, and a second diode D2.

As shown in FIG. 10, the first power switch Q1, the second power switch Q2, the third power switch Q3, and the fourth power switch Q4 are connected in series; after being connected in series, the first diode D1 and the second diode D2 are connected to two terminals of a path in parallel, where in the path, the second power switch Q2 is connected to the third power switch Q3; and a point between the first diode D1 and the second diode D2 is grounded. In other words, the first power switch Q1 and the first diode D1 are connected in series on one bus, and the fourth power switch Q4 and the second diode D2 are connected in series on the other bus. The inverter shown in FIG. 10 is a single-phase NPC-type inverter.

In this case, the controller 203 in FIG. 5 is further configured to input a third trigger signal to the first power switch Q1, to detect a voltage at an input terminal of the first power switch Q1, that is, a voltage on the bus on which the first power switch Q1 is located, and diagnose, based on the voltage on the bus, whether the first diode D1 is short-circuited. If the voltage on the bus does not change, it is determined that the first diode D1 is normal. If the voltage on the bus drops sharply, it is determined that the first diode D1 is short-circuited.

In addition, the controller 203 in FIG. 5 is further configured to input a third trigger signal to the fourth power switch Q4, to detect a voltage at an output terminal of the fourth power switch Q4, that is, a voltage on the bus on which the fourth power switch Q4 is located, and diagnose, based on the voltage on the bus, whether the second diode D2 is short-circuited. If the voltage on the bus does not change, it is determined that the second diode D2 is normal. If the voltage on the bus drops sharply, it is determined that the second diode D2 is short-circuited.

Figure 11:
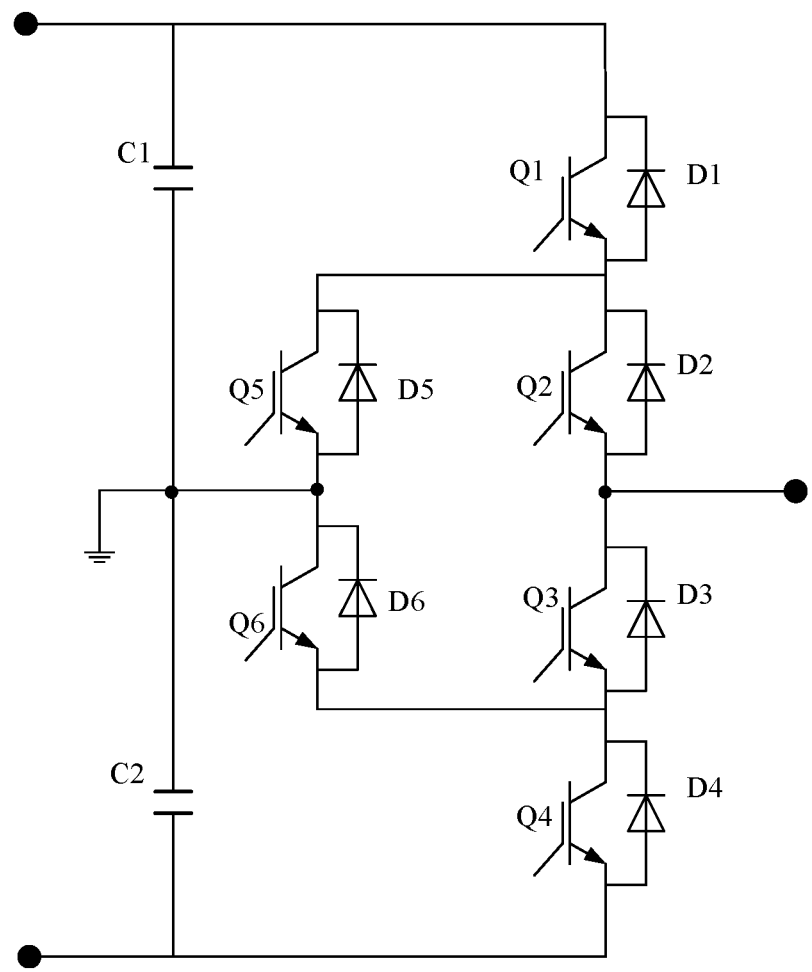
FIG. 11 is a schematic structural diagram of another inverter according to an embodiment of this application.

FIG. 11 is a schematic structural diagram of another inverter according to an embodiment of this application. As shown in FIG. 11, the inverter includes a first power switch Q1, a second power switch Q2, a third power switch Q3, a fourth power switch Q4, a fifth power switch Q5, and a sixth power switch Q6.

As shown in FIG. 11, the first power switch Q1, the second power switch Q2, the third power switch Q3, and the fourth power switch Q4 are connected in series; after being connected in series, the fifth power switch Q5 and the sixth power switch Q6 are connected to two terminals of a path in parallel, where in the path, the second power switch Q2 is connected to the third power switch Q3; and a point between the fifth power switch Q5 and the sixth power switch Q6 is grounded. In other words, the first power switch Q1 and the fifth power switch Q5 are connected in series on one bus, and the fourth power switch Q4 and the sixth power switch Q6 are connected in series on the other bus. A diode is connected to two terminals of each power switch in parallel, as shown in the figure. The inverter shown in FIG. 11 is a single-phase aNPC-type inverter.

In this case, the controller 203 in FIG. 5 is further configured to input a third trigger signal to the first power switch Q1, to detect a voltage at an input terminal of the first power switch Q1, that is, a voltage on the bus on which the first power switch Q1 is located, and diagnose, based on the voltage on the bus, whether the fifth power switch Q5 and a fifth diode D5 connected to the fifth power switch in parallel are short-circuited. If the voltage on the bus does not change, it is determined that the fifth power switch Q5 and the fifth diode D5 connected to the fifth power switch Q5 in parallel are normal. If the voltage on the bus drops sharply, it is determined that the fifth power switch Q5 and the fifth diode D5 connected to the fifth power switch Q5 in parallel are short-circuited.

In addition, the controller 203 in FIG. 5 is further configured to input a third trigger signal to the fifth power switch Q5, to detect a voltage at an input terminal of the fifth power switch Q5, that is, a voltage on the bus on which the fifth power switch Q5 is located, and diagnose, based on the voltage on the bus, whether the first power switch Q1 and a first diode D1 connected to the first power switch Q1 in parallel are short-circuited. If the voltage on the bus does not change, it is determined that the first power switch Q1 and the first diode D1 connected to the first power switch Q1 in parallel are normal. If the voltage on the bus drops sharply, it is determined that the first power switch Q1 and the first diode D1 connected to the first power switch Q1 in parallel are short-circuited.

In addition, the controller 203 in FIG. 5 is further configured to input a third trigger signal to the fourth power switch Q4, to detect a voltage at an output terminal of the fourth power switch Q4, that is, a voltage on the bus on which the fourth power switch Q4 is located, and diagnose, based on the voltage on the bus, whether the sixth power switch Q6 and a sixth diode D6 connected to the sixth power switch Q6 in parallel are short-circuited. If the voltage on the bus does not change, it is determined that the sixth power switch Q6 and the sixth diode D6 connected to the sixth power switch Q6 in parallel are normal. If the voltage on the bus drops sharply, it is determined that the sixth power switch Q6 and the sixth diode D6 connected to the sixth power switch Q6 in parallel are short-circuited.

In addition, the controller 203 in FIG. 5 is further configured to input a third trigger signal to the sixth power switch Q6, to detect a voltage at an output terminal of the sixth power switch Q6, that is, a voltage on the bus on which the sixth power switch Q6 is located, and diagnose, based on the voltage on the bus, whether the fourth power switch Q4 and a fourth diode D4 connected to the fourth power switch Q4 in parallel are short-circuited. If the voltage on the bus does not change, it is determined that the fourth power switch Q4 and the fourth diode D4 connected to the fourth power switch Q4 in parallel are normal. If the voltage on the bus drops sharply, it is determined that the fourth power switch Q4 and the fourth diode D4 connected to the fourth power switch Q4 in parallel are short-circuited.

Figure 12:
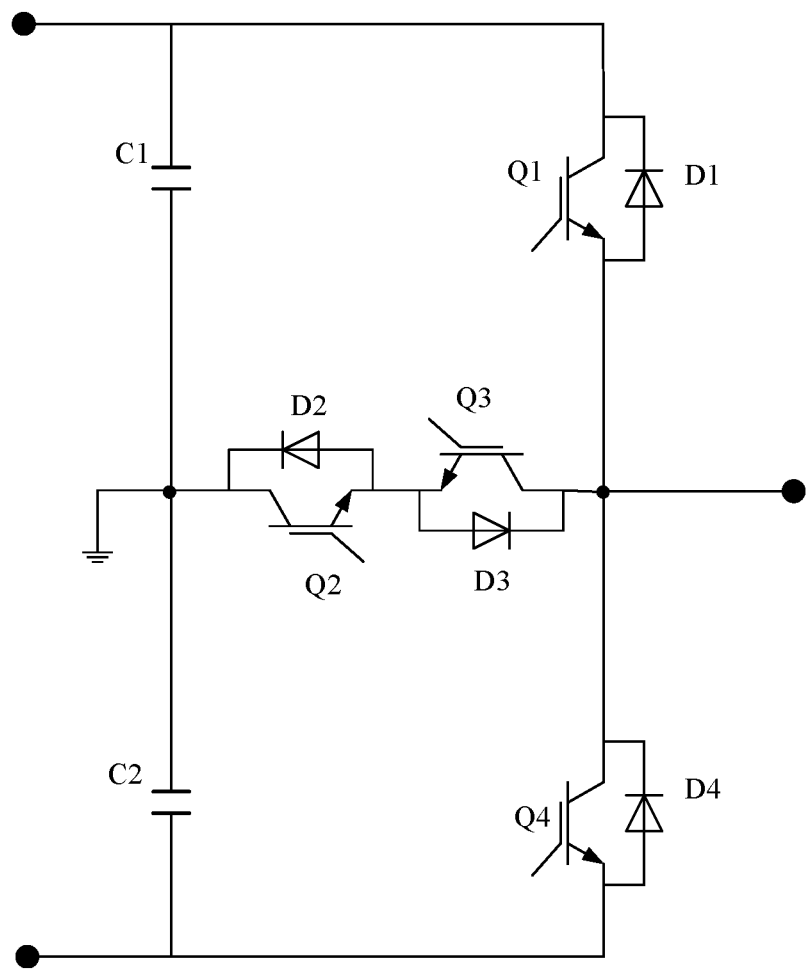
FIG. 12 is a schematic structural diagram of another inverter according to an embodiment of this application.

FIG. 12 is a schematic structural diagram of another inverter according to an embodiment of this application. As shown in FIG. 12, the inverter includes a first power switch Q1, a second power switch Q2, a third power switch Q3, and a fourth power switch Q4. The first power switch Q1 and the third power switch Q3 are connected in series on one bus, and the second power switch Q2 and the fourth power switch Q4 are connected in series on the other bus. A diode is connected to two terminals of each power switch in parallel, as shown in the figure. The inverter shown in FIG. 12 is a single-phase T-type inverter.

In this case, the controller 203 in FIG. 5 is further configured to input a third trigger signal to the first power switch Q1, to detect a voltage at an input terminal of the first power switch Q1, that is, a voltage on the bus on which the first power switch Q1 is located, and diagnose, based on the voltage on the bus, whether the third power switch Q3 and a third diode D3 connected to the third power switch Q3 in parallel are short-circuited. If the voltage on the bus does not change, it is determined that the third power switch Q3 and the third diode D3 connected to the third power switch Q3 in parallel are normal. If the voltage on the bus drops sharply, it is determined that the third power switch Q3 and the third diode D3 connected to the third power switch Q3 in parallel are short-circuited.

In addition, the controller 203 in FIG. 5 is further configured to input a third trigger signal to the third power switch Q3, to detect a voltage at an input terminal of the third power switch Q3, that is, a voltage on the bus on which the third power switch Q3 is located, and diagnose, based on the voltage on the bus, whether the first power switch Q1 and a first diode D1 connected to the first power switch Q1 in parallel are short-circuited. If the voltage on the bus does not change, it is determined that the first power switch Q1 and the first diode D1 connected to the first power switch Q1 in parallel are normal. If the voltage on the bus drops sharply, it is determined that the first power switch Q1 and the first diode D1 connected to the first power switch Q1 in parallel are short-circuited.

In addition, the controller 203 in FIG. 5 is further configured to input a third trigger signal to the fourth power switch Q4, to detect a voltage at an output terminal of the fourth power switch Q4, that is, a voltage on the bus on which the fourth power switch Q4 is located, and diagnose, based on the voltage on the bus, whether the second power switch Q2 and a second diode D2 connected to the second power switch Q2 in parallel are short-circuited. If the voltage on the bus does not change, it is determined that the second power switch Q2 and the second diode D2 connected to the second power switch Q2 in parallel are normal. If the voltage on the bus drops sharply, it is determined that the second power switch Q2 and the second diode D2 connected to the second power switch Q2 in parallel are short-circuited.

In addition, the controller 203 in FIG. 5 is further configured to input a third trigger signal to the second power switch Q2, to detect a voltage at an output terminal of the second power switch Q2, that is, a voltage on the bus on which the second power switch Q2 is located, and diagnose, based on the voltage on the bus, whether the fourth power switch Q4 and a fourth diode D4 connected to the fourth power switch Q4 in parallel are short-circuited. If the voltage on the bus does not change, it is determined that the fourth power switch Q4 and the fourth diode D4 connected to the fourth power switch Q4 in parallel are normal. If the voltage on the bus drops sharply, it is determined that the fourth power switch Q4 and the fourth diode D4 connected to the fourth power switch Q4 in parallel are short-circuited.

Figure 13:
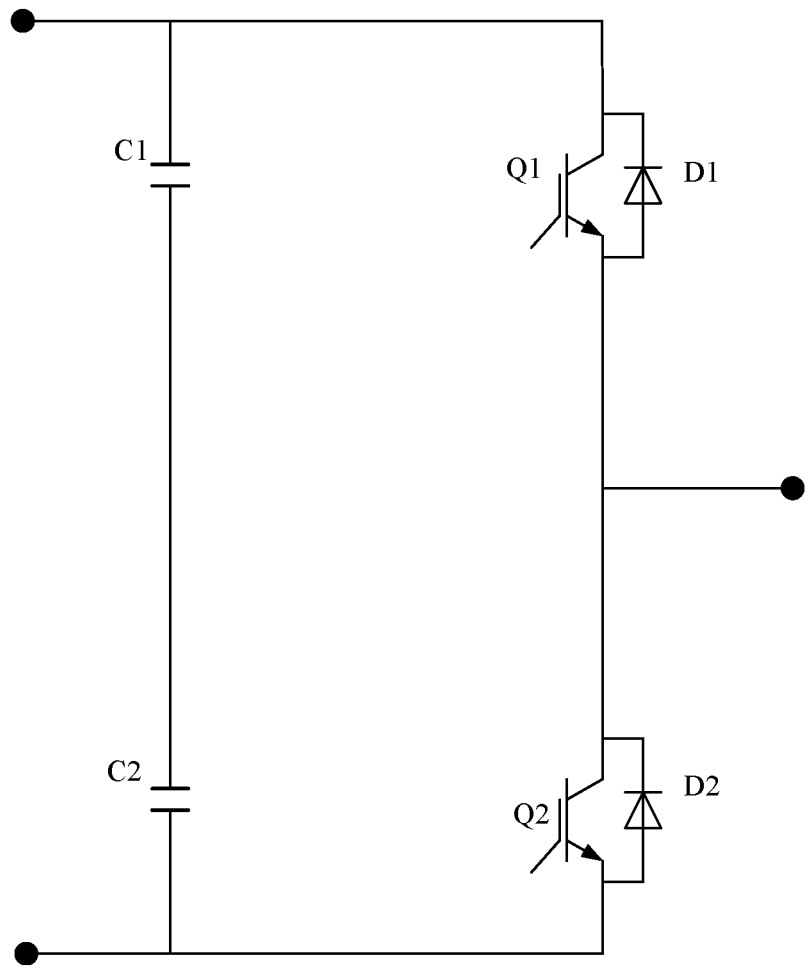
FIG. 13 is a schematic structural diagram of another inverter according to an embodiment of this application.

FIG. 13 is a schematic structural diagram of another inverter according to an embodiment of this application. As shown in FIG. 13, the inverter includes a first power switch Q1 and a second power switch Q2. The first power switch Q1 and the second power switch Q2 are connected in series on a bus. A diode is connected to two terminals of each power switch in parallel, as shown in the figure. The inverter shown in FIG. 13 is a single-phase half-bridge inverter.

In this case, the controller 203 in FIG. 5 is further configured to input a second trigger signal to the first power switch Q1, to detect a voltage at an input terminal of the first power switch Q1, that is, a voltage on the bus on which the first power switch Q1 is located, and diagnose, based on the voltage on the bus, whether the second power switch Q2 and a second diode D2 connected to the second power switch Q2 in parallel are short-circuited. If the voltage on the bus does not change, it is determined that the second power switch Q2 and the second diode D2 connected to the second power switch Q2 in parallel are normal. If the voltage on the bus drops sharply, it is determined that the second power switch Q2 and the second diode D2 connected to the second power switch Q2 in parallel are short-circuited.

In addition, the controller 203 in FIG. 5 is further configured to input a second trigger signal to the second power switch Q2, to detect a voltage at an input terminal of the second power switch Q2, that is, a voltage on the bus on which the second power switch Q2 is located, and diagnose, based on the voltage on the bus, whether the first power switch Q1 and a first diode D1 connected to the first power switch Q1 in parallel are short-circuited. If the voltage on the bus does not change, it is determined that the first power switch Q1 and the first diode D1 connected to the first power switch Q1 in parallel are normal. If the voltage on the bus drops sharply, it is determined that the first power switch Q1 and the first diode D1 connected to the first power switch Q1 in parallel are short-circuited.

FIG. 10 to FIG. 13 are merely used as examples for describing how to perform the power-on self-test operation on the inverter. For another type of inverter, refer to the foregoing processes to perform the power-on self-test operation on the inverter.

In addition, the power-on self-test operation is performed before the inverter apparatus provided in the embodiments of this application is used to supply power to the power grid. Three working modes are set in the controller. In one working mode, the first trigger signal is output, and used to implement that the power grid stores electric energy in the energy storage system in FIG. 2. In one working mode, the second trigger signal is output, and used to implement turning-on of the power switch in a zero-voltage scenario in FIG. 5. In another working mode, the third trigger signal is output, and used to implement a self-test for a short-circuit fault of an inverter unit or a bus in the inverter apparatus.

The inverter apparatus provided in the foregoing embodiments may be used in the power supply system shown in FIG. 1. Therefore, an embodiment of this application further provides a power supply system. The power supply system includes the plurality of direct current source units in FIG. 2, the energy storage system in FIG. 2, and any one of the foregoing inverter apparatuses.

Each direct current source unit is connected to an input terminal of a protection unit, an output terminal of each protection unit is connected to a direct current input terminal of an inverter unit, and an alternating current output terminal of each inverter unit is configured to connect to a power grid, to provide an alternating current to the power grid.

Working principles of the power supply system have been described in detail in the foregoing process in which the inverter apparatus is described. Therefore, details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or a compact disc.

The foregoing descriptions are merely embodiments of this application, but are not intended to limit this application. Any modification, equivalent replacement, or improvement made without departing from the spirit and principle of this application should fall within the protection scope of this application.

What is claimed is:

1. An inverter apparatus comprising a plurality of inverter units, each inverter unit of the plurality of inverter units comprising a direct current input terminal and an alternating current output terminal configured to connect to a power grid; and a plurality of protection units, each protection unit of the plurality of protection units comprising an input terminal, an output terminal, and a control terminal, wherein the input terminal of each protection unit is configured to connect to one of a plurality of direct current source units in a power supply system, and wherein the output terminal of each protection unit is connected to a direct current input terminal of one of the plurality of inverter units; wherein the input terminal of each protection unit is configured to connect to a same energy storage system; and wherein, for each protection unit, when a voltage at the input terminal is greater than a voltage at the output terminal, a path between the input terminal and the output terminal is configured to be in a forward conducted state; when a voltage at the output terminal is greater than a voltage at the input terminal, a path between the input terminal and the output terminal is configured to be in a reverse cut-off state; or when the control terminal receives a first trigger signal, a path between the input terminal and the output terminal is configured to be in a reverse conducted state;

the plurality of protection units comprising a plurality of diodes and a plurality of power switches, wherein each protection unit comprises a diode and a power switch; wherein an anode of the diode is configured to connect to a direct current source unit of the plurality of direct current source units, a cathode of the diode is connected to a direct current input terminal of an inverter unit of the plurality of inverter units, the anode of the diode is connected to a cathode of the power switch, and the cathode of the diode is connected to an anode of the power switch; and wherein the inverter apparatus further comprises a controller, wherein a first control terminal of the controller is connected to a control electrode of each power switch of the plurality of power switches and configured to output the first trigger signal, and wherein, when receiving the first trigger signal, each power switch controls a path between an anode of the power switch and a cathode of the power switch to be in a conducted state.

2. The inverter apparatus according to claim 1, wherein the inverter apparatus further comprises a plurality of direct current-direct current converters, an input terminal of each direct current-direct current converter is connected to a direct current source unit of the plurality of direct current source units, an output terminal of each direct current-direct current converter is connected to an anode of a corresponding diode of the plurality of diodes, and a control terminal of each direct current-direct current converter is connected to a second control terminal of the controller; and wherein the second control terminal of the controller is configured to output a second trigger signal, and wherein, when receiving the second trigger signal, each direct current-direct current converter increases an output voltage to enable the corresponding diode connected to each direct current-direct current converter to be in a conducted state.

3. The inverter apparatus according to claim 1, wherein each protection unit comprises a first protection unit, and the direct current input terminal of each inverter unit comprises a positive bus input terminal and a negative bus input terminal; wherein an input terminal of each first protection unit is configured to connect to a positive bus output terminal of a corresponding direct current source unit of the plurality of direct current source units, an output terminal of each first protection unit is connected to a positive bus input terminal of a corresponding inverter unit of the plurality of inverter units, and a negative bus input terminal of the corresponding inverter unit is connected to a negative bus output terminal of the corresponding direct current source unit; and wherein the input terminal of each first protection unit is further configured to connect to a positive bus input terminal of the energy storage system, and the negative bus input terminal of each inverter unit is further configured to connect to a negative bus input terminal of the energy storage system.

4. The inverter apparatus according to claim 1, wherein each protection unit comprises a second protection unit, and the direct current input terminal of each inverter unit comprises a positive bus input terminal and a negative bus input terminal; wherein an input terminal of each second protection unit is configured to connect to a negative bus output terminal of a corresponding direct current source unit of the plurality of direct current source units, an output terminal of each second protection unit is connected to a negative bus input terminal of a corresponding inverter unit of the plurality of inverter units, and a positive bus input terminal of the corresponding inverter unit is connected to a positive bus output terminal of the corresponding direct current source unit; and wherein the input terminal of each second protection unit is further configured to connect to a negative bus input terminal of the energy storage system, and the positive bus input terminal of each inverter unit is further configured to connect to a positive bus input terminal of the energy storage system.

5. The inverter apparatus according to claim 1, wherein each protection unit comprises a first protection unit and a second protection unit, and the direct current input terminal of each inverter unit comprises a positive bus input terminal and a negative bus input terminal; wherein an input terminal of each first protection unit is configured to connect to a positive bus output terminal of a corresponding direct current source unit of the plurality of direct current source units, and an output terminal of each first protection unit is connected to a positive bus input terminal of a corresponding inverter unit of the plurality of inverter units; wherein an input terminal of each second protection unit is configured to connect to a negative bus output terminal of the corresponding direct current source unit, and an output terminal of each second protection unit is connected to a negative bus input terminal of the corresponding inverter unit; and wherein the input terminal of each first protection unit is further configured to connect to a positive bus input terminal of the energy storage system, and the input terminal of each second protection unit is further configured to connect to a negative bus input terminal of the energy storage system.

6. The inverter apparatus according to claim 1, further comprising a plurality of first capacitors; wherein one terminal of each first capacitor of the plurality of first capacitors is connected to an input terminal of a corresponding protection unit of the plurality of protection units, and the other terminal of each first capacitor is connected to a bus on which the plurality of protection units are not deployed.

7. The inverter apparatus according to claim 1, further comprising a plurality of second capacitors; and one terminal of each second capacitor of the plurality of second capacitors is connected to an output terminal of a corresponding protection unit of the plurality of protection units, and the other terminal of each second capacitor is connected to the bus on which the plurality of protection units are not deployed.

8. The inverter apparatus according to claim 1, wherein each inverter unit comprises one or more inverters, the one or more inverters are connected in parallel, and wherein two power components connected in series are deployed on a bus of each inverter; and wherein, for each inverter, the controller is further configured to input a third trigger signal to a power component on a bus of an inverter, to detect a voltage on the bus and diagnose, based on the voltage on the bus, whether the other power component connected to the power component in series is short-circuited.

9. A power supply system, comprising a plurality of direct current source units; an energy storage system; and an inverter apparatus comprising a plurality of inverter units, each inverter unit of the plurality of inverter units comprising a direct current input terminal and an alternating current output terminal configured to connect to a power grid; and a plurality of protection units, each protection unit of the plurality of protection units comprising an input terminal, an output terminal, and a control terminal, wherein the input terminal of each protection unit is configured to connect to one of the plurality of direct current source units in the power supply system, and wherein the output terminal of each protection unit is connected to a direct current input terminal of one of the plurality of inverter units; wherein the input terminal of each protection unit is configured to connect to the energy storage system; and wherein, for each protection unit, when a voltage at the input terminal is greater than a voltage at the output terminal, a path between the input terminal of the any protection unit and the output terminal of the any protection unit is configured to be in a forward conducted state; when a voltage at the output terminal is greater than a voltage at the input terminal, a path between the input terminal of the any protection unit and the output terminal of the any protection unit is configured to be in a reverse cut-off state; or when the control terminal receives a first trigger signal, a path between the input terminal of the any protection unit and the output terminal of the any protection unit is configured to be in a reverse conducted state, wherein each direct current source unit of the plurality of direct current source units is connected to an input terminal of a corresponding protection unit of the plurality of protection units, an output terminal of each protection unit is connected to a direct current input terminal of a corresponding inverter unit of the plurality of inverter units, and an alternating current output terminal of each inverter unit is configured to connect to the power grid to provide an alternating current to the power grids; the plurality of protection units comprising a plurality of diodes and a plurality of power switches, wherein each protection unit comprises a diode and a power switch; wherein an anode of the diode is configured to connect to a direct current source unit of the plurality of direct current source units, a cathode of the diode is connected to a direct current input terminal of an inverter unit of the plurality of inverter units, the anode of the diode is connected to a cathode of the power switch, and the cathode of the diode is connected to an anode of the power switch; and wherein the inverter apparatus further comprises a controller, wherein a first control terminal of the controller is connected to a control electrode of each power switch of the plurality of power switches and configured to output the first trigger signal, and wherein, when receiving the first trigger signal, each power switch controls a path between an anode of the power switch and a cathode of the power switch to be in a conducted state.

10. The power supply system according to claim 9, wherein the inverter apparatus further comprises a plurality of direct current-direct current converters, an input terminal of each direct current-direct current converter is connected to a direct current source unit of the plurality of direct current source units, an output terminal of each direct current-direct current converter is connected to an anode of a corresponding diode of the plurality of diodes, and a control terminal of each direct current-direct current converter is connected to a second control terminal of the controller; and wherein the second control terminal of the controller is configured to output a second trigger signal, and wherein, when receiving the second trigger signal, each direct current-direct current converter increases an output voltage to enable the corresponding diode connected to each direct current-direct current converter to be in a conducted state.

11. The power supply system according to claim 9, wherein each protection unit comprises a first protection unit, and the direct current input terminal of each inverter unit comprises a positive bus input terminal and a negative bus input terminal; wherein an input terminal of each first protection unit is configured to connect to a positive bus output terminal of a direct current source unit of the plurality of direct current source units, an output terminal of each first protection unit is connected to a positive bus input terminal of a corresponding inverter unit of the plurality of inverter units, and a negative bus input terminal of the corresponding inverter unit is connected to a negative bus output terminal of the corresponding direct current source unit; and wherein the input terminal of each first protection unit is further configured to connect to a positive bus input terminal of the energy storage system, and the negative bus input terminal of each inverter unit is further configured to connect to a negative bus input terminal of the energy storage system.

12. The power supply system according to claim 9, wherein each protection unit comprises a second protection unit, and the direct current input terminal of each inverter unit comprises a positive bus input terminal and a negative bus input terminal; wherein an input terminal of each second protection unit is configured to connect to a negative bus output terminal of a corresponding direct current source unit of the plurality of direct current source units, an output terminal of each second protection unit is connected to a negative bus input terminal of a corresponding inverter unit of the plurality of inverter units, and a positive bus input terminal of the corresponding inverter unit is connected to a positive bus output terminal of the corresponding direct current source unit; and wherein the input terminal of each second protection unit is further configured to connect to a negative bus input terminal of the energy storage system, and the positive bus input terminal of each inverter unit is further configured to connect to a positive bus input terminal of the energy storage system.

13. The power supply system according to claim 9, wherein each protection unit comprises a first protection unit and a second protection unit, and the direct current input terminal of each inverter unit comprises a positive bus input terminal and a negative bus input terminal; wherein an input terminal of each first protection unit is configured to connect to a positive bus output terminal of a corresponding direct current source unit of the plurality of direct current source units, and an output terminal of each first protection unit is connected to a positive bus input terminal of a corresponding inverter unit of the plurality of inverter units; wherein an input terminal of each second protection unit is configured to connect to a negative bus output terminal of the corresponding direct current source unit, and an output terminal of each second protection unit is connected to a negative bus input terminal of the corresponding inverter unit; and wherein the input terminal of each first protection unit is further configured to connect to a positive bus input terminal of the energy storage system, and the input terminal of each second protection unit is further configured to connect to a negative bus input terminal of the energy storage system.

14. The power supply system according to claim 9, further comprising a plurality of first capacitors; and wherein one terminal of each first capacitor of the plurality of first capacitors is connected to an input terminal of a corresponding protection unit of the plurality of protection units, and the other terminal of each first capacitor is connected to a bus on which the plurality of protection units are not deployed.

15. The power supply system according to claim 9, further comprising a plurality of second capacitors; and one terminal of each second capacitor of the plurality of second capacitors is connected to an output terminal of a corresponding protection unit of the plurality of protection units, and the other terminal of each second capacitor is connected to the bus on which the plurality of protection units are not deployed.

16. The power supply system according to claim 9, wherein each inverter unit comprises one or more inverters, the one or more inverters are connected in parallel, and wherein two power components connected in series are deployed on a bus of each inverter; and wherein, for each inverter, the controller is further configured to input a third trigger signal to a power component on a bus of an inverter, to detect a voltage on the bus and diagnose, based on the voltage on the bus, whether the other power component connected to the power component in series is short-circuited.

* * * * *